(12) United States Patent
Pan

(10) Patent No.: US 9,953,667 B2
(45) Date of Patent: Apr. 24, 2018

(54) DISK DRIVE SYSTEM

(71) Applicant: WESTERN DIGITAL TECHNOLOGIES, INC., Irvine, CA (US)

(72) Inventor: Tzong-Shii Pan, San Jose, CA (US)

(73) Assignee: Western Digital Technologies, Inc., Irvine, CA (US)

(*) Notice: Subject to any disclaimer, the term of this patent is extended or adjusted under 35 U.S.C. 154(b) by 0 days.

(21) Appl. No.: 15/429,228

(22) Filed: Feb. 10, 2017

(65) Prior Publication Data

US 2017/0154645 A1    Jun. 1, 2017

Related U.S. Application Data

(60) Division of application No. 14/492,266, filed on Sep. 22, 2014, now Pat. No. 9,633,680, which is a
(Continued)

(51) Int. Cl.
    B23P 19/00    (2006.01)
    G11B 5/48    (2006.01)

(52) U.S. Cl.
    CPC ............ G11B 5/4846 (2013.01); G11B 5/486 (2013.01); G11B 5/4826 (2013.01);
    (Continued)

(58) Field of Classification Search
    CPC ..... G11B 5/4833; G11B 5/4826; G11B 5/127; G11B 5/1272; G11B 5/4813;
    (Continued)

(56) References Cited

U.S. PATENT DOCUMENTS

| 5,103,359 A | 4/1992 | Marazzo |
| 5,238,482 A | 8/1993 | Schmitz |

(Continued)

FOREIGN PATENT DOCUMENTS

| JP | 10-275430 A | 10/1998 |
| JP | 2007-173363 A | 7/2007 |

OTHER PUBLICATIONS

US 7,337,529, 03/2008, Bennin et al. (withdrawn)
(Continued)

*Primary Examiner* — Thiem Phan
(74) *Attorney, Agent, or Firm* — Foley & Lardner LLP

(57) ABSTRACT

A head gimbal assembly has a laminate flexure that includes a metallic conductive layer that includes a plurality of electrically conductive traces that are elongated and narrow and electrically connected to the read head, and a metallic structural layer that is stiffer than the conductive layer. A first dielectric layer is disposed between the structural layer and the conductive layer. A second dielectric layer substantially covers the conductive layer in a flexure tail bonding region that overlaps a flexible printed circuit (FPC). The structural layer includes a plurality of flexure bond pads that are aligned with, facing, and bonded to corresponding FPC bond pads. The flexure bond pads in the structural layer are electrically connected to the electrically conductive traces in the conductive layer by vias through the first dielectric layer. In certain embodiments, the flexure tail is folded upon itself in the flexure tail bonding region.

7 Claims, 7 Drawing Sheets

Related U.S. Application Data continuation-in-part of application No. 13/897,609, filed on May 20, 2013, now Pat. No. 9,214,174, which is a division of application No. 12/916,237, filed on Oct. 29, 2010, now Pat. No. 8,467,153.

(52) U.S. Cl.
CPC .......... *G11B 5/4833* (2013.01); *G11B 5/4853* (2013.01); *Y10T 29/49057* (2015.01); *Y10T 29/53261* (2015.01)

(58) Field of Classification Search
CPC ......... Y10T 29/53261; Y10T 29/49025; Y10T 29/49027
USPC ............. 29/759, 729, 602.1, 603.01, 603.02, 29/603.03, 603.12, 715, 739
See application file for complete search history.

(56) References Cited

U.S. PATENT DOCUMENTS

| | | |
|---|---|---|
| 5,465,186 A | 11/1995 | Bajorek et al. |
| 5,861,661 A | 1/1999 | Tang et al. |
| 5,903,056 A | 5/1999 | Canning et al. |
| 6,025,988 A | 2/2000 | Yan |
| 6,036,813 A | 3/2000 | Schulz et al. |
| 6,046,889 A | 4/2000 | Berding et al. |
| 6,052,890 A | 4/2000 | Malagrino, Jr. et al. |
| 6,061,206 A | 5/2000 | Foisy et al. |
| 6,076,256 A | 6/2000 | Drake et al. |
| 6,101,876 A | 8/2000 | Brooks et al. |
| 6,147,831 A | 11/2000 | Kennedy et al. |
| 6,151,189 A | 11/2000 | Brooks |
| 6,151,197 A | 11/2000 | Larson et al. |
| 6,185,067 B1 | 2/2001 | Chamberlain |
| 6,185,074 B1 | 2/2001 | Wang et al. |
| 6,208,486 B1 | 3/2001 | Gustafson et al. |
| 6,212,046 B1 | 4/2001 | Albrecht et al. |
| 6,215,616 B1 | 4/2001 | Phan et al. |
| 6,228,689 B1 | 5/2001 | Liu |
| 6,272,694 B1 | 8/2001 | Weaver et al. |
| 6,288,866 B1 | 9/2001 | Butler et al. |
| 6,292,333 B1 | 9/2001 | Blumentritt et al. |
| 6,344,950 B1 | 2/2002 | Watson et al. |
| 6,349,464 B1 | 2/2002 | Codilian et al. |
| 6,351,352 B1 | 2/2002 | Khan et al. |
| 6,381,099 B1 | 4/2002 | Mei |
| 6,382,499 B1 | 5/2002 | Satoh et al. |
| 6,388,873 B1 | 5/2002 | Brooks et al. |
| 6,399,889 B1 | 6/2002 | Korkowski et al. |
| 6,417,979 B1 | 7/2002 | Patton, III et al. |
| 6,421,208 B1 | 7/2002 | Oveyssi |
| 6,441,998 B1 | 8/2002 | Abrahamson |
| 6,462,914 B1 | 10/2002 | Oveyssi et al. |
| 6,466,398 B1 | 10/2002 | Butler et al. |
| 6,469,871 B1 | 10/2002 | Wang |
| 6,502,300 B1 | 1/2003 | Casey et al. |
| 6,519,116 B1 | 2/2003 | Lin et al. |
| 6,529,345 B1 | 3/2003 | Butler et al. |
| 6,529,351 B1 | 3/2003 | Oveyssi et al. |
| 6,535,358 B1 | 3/2003 | Hauert et al. |
| 6,545,382 B1 | 4/2003 | Bennett |
| 6,549,381 B1 | 4/2003 | Watson |
| 6,560,065 B1 * | 5/2003 | Yang .................... G11B 33/148 360/97.15 |
| 6,570,460 B1 | 6/2003 | Casey et al. |
| 6,574,073 B1 | 6/2003 | Hauert et al. |
| 6,580,574 B1 | 6/2003 | Codilian |
| 6,594,111 B1 | 7/2003 | Oveyssi et al. |
| 6,603,620 B1 | 8/2003 | Berding |
| 6,614,623 B2 | 9/2003 | Nakamura et al. |
| 6,618,222 B1 | 9/2003 | Watkins et al. |
| 6,624,966 B1 | 9/2003 | Ou-Yang et al. |
| 6,624,980 B1 | 9/2003 | Watson et al. |
| 6,624,983 B1 | 9/2003 | Berding |
| 6,628,473 B1 | 9/2003 | Codilian et al. |
| 6,634,086 B2 | 10/2003 | Korkowski et al. |
| 6,639,757 B2 | 10/2003 | Morley et al. |
| 6,654,200 B1 | 11/2003 | Alexander et al. |
| 6,656,772 B2 | 12/2003 | Huang |
| 6,657,811 B1 | 12/2003 | Codilian |
| 6,661,597 B1 | 12/2003 | Codilian et al. |
| 6,661,603 B1 | 12/2003 | Watkins et al. |
| 6,674,600 B1 | 1/2004 | Codilian et al. |
| 6,690,637 B1 | 2/2004 | Codilian |
| 6,693,767 B1 | 2/2004 | Butler |
| 6,693,773 B1 | 2/2004 | Sassine |
| 6,697,217 B1 | 2/2004 | Codilian |
| 6,698,286 B1 | 3/2004 | Little et al. |
| 6,700,736 B1 | 3/2004 | Wu et al. |
| 6,703,566 B1 | 3/2004 | Shiraishi et al. |
| 6,704,167 B1 | 3/2004 | Scura et al. |
| 6,707,637 B1 | 3/2004 | Codilian et al. |
| 6,707,641 B1 | 3/2004 | Oveyssi et al. |
| 6,708,389 B1 | 3/2004 | Carlson et al. |
| 6,710,980 B1 | 3/2004 | Hauert et al. |
| 6,710,981 B1 | 3/2004 | Oveyssi et al. |
| 6,728,062 B1 | 4/2004 | Ou-Yang et al. |
| 6,728,063 B1 | 4/2004 | Gustafson et al. |
| 6,731,470 B1 | 5/2004 | Oveyssi |
| 6,735,033 B1 | 5/2004 | Codilian et al. |
| 6,741,426 B2 | 5/2004 | Girard |
| 6,741,428 B1 | 5/2004 | Oveyssi |
| 6,751,051 B1 | 6/2004 | Garbarino |
| 6,754,042 B1 | 6/2004 | Chiou et al. |
| 6,757,132 B1 | 6/2004 | Watson et al. |
| 6,757,139 B2 | 6/2004 | Mei |
| 6,759,784 B1 | 7/2004 | Gustafson et al. |
| 6,781,780 B1 | 8/2004 | Codilian |
| 6,781,787 B1 | 8/2004 | Codilian et al. |
| 6,781,791 B1 | 8/2004 | Griffin et al. |
| 6,790,066 B1 | 9/2004 | Klein |
| 6,791,791 B1 | 9/2004 | Alfred et al. |
| 6,791,801 B1 | 9/2004 | Oveyssi |
| 6,795,262 B1 | 9/2004 | Codilian et al. |
| 6,798,603 B1 | 9/2004 | Singh et al. |
| 6,801,389 B1 | 10/2004 | Berding et al. |
| 6,801,404 B1 | 10/2004 | Oveyssi |
| 6,816,342 B1 | 11/2004 | Oveyssi |
| 6,816,343 B1 | 11/2004 | Oveyssi |
| 6,825,622 B1 | 11/2004 | Ryan et al. |
| 6,826,009 B1 | 11/2004 | Scura et al. |
| 6,831,810 B1 | 12/2004 | Butler et al. |
| 6,839,199 B1 | 1/2005 | Alexander, Jr. et al. |
| 6,844,996 B1 | 1/2005 | Berding et al. |
| 6,847,504 B1 | 1/2005 | Bennett et al. |
| 6,847,506 B1 | 1/2005 | Lin et al. |
| 6,856,491 B1 | 2/2005 | Oveyssi |
| 6,856,492 B2 | 2/2005 | Oveyssi |
| 6,862,154 B1 | 3/2005 | Subrahmanyam et al. |
| 6,862,156 B1 | 3/2005 | Lin et al. |
| 6,862,176 B1 | 3/2005 | Codilian et al. |
| 6,865,049 B1 | 3/2005 | Codilian et al. |
| 6,865,055 B1 | 3/2005 | Ou-Yang et al. |
| 6,867,946 B1 | 3/2005 | Berding et al. |
| 6,867,950 B1 | 3/2005 | Lin |
| 6,876,514 B1 | 4/2005 | Little |
| 6,879,466 B1 | 4/2005 | Oveyssi et al. |
| 6,888,697 B1 | 5/2005 | Oveyssi |
| 6,888,698 B1 | 5/2005 | Berding et al. |
| 6,891,696 B1 | 5/2005 | Ou-Yang et al. |
| 6,898,052 B1 | 5/2005 | Oveyssi |
| 6,900,961 B1 | 5/2005 | Butler |
| 6,906,880 B1 | 6/2005 | Codilian |
| 6,906,897 B1 | 6/2005 | Oveyssi |
| 6,908,330 B2 | 6/2005 | Garrett et al. |
| 6,922,308 B1 | 7/2005 | Butler |
| 6,930,848 B1 | 8/2005 | Codilian et al. |
| 6,930,857 B1 | 8/2005 | Lin et al. |
| 6,934,126 B1 | 8/2005 | Berding et al. |
| 6,937,441 B2 | 8/2005 | Okamoto et al. |
| 6,937,444 B1 | 8/2005 | Oveyssi |
| 6,940,698 B2 | 9/2005 | Lin et al. |

(56) References Cited

U.S. PATENT DOCUMENTS

| | | |
|---|---|---|
| 6,941,642 B1 | 9/2005 | Subrahmanyam et al. |
| 6,947,251 B1 | 9/2005 | Oveyssi et al. |
| 6,950,275 B1 | 9/2005 | Ali et al. |
| 6,950,284 B1 | 9/2005 | Lin |
| 6,952,318 B1 | 10/2005 | Ngo |
| 6,954,329 B1 | 10/2005 | Ojeda et al. |
| 6,958,884 B1 | 10/2005 | Ojeda et al. |
| 6,958,890 B1 | 10/2005 | Lin et al. |
| 6,961,212 B1 | 11/2005 | Gustafson et al. |
| 6,961,218 B1 | 11/2005 | Lin et al. |
| 6,963,469 B1 | 11/2005 | Gustafson et al. |
| 6,965,500 B1 | 11/2005 | Hanna et al. |
| 6,967,800 B1 | 11/2005 | Chen et al. |
| 6,967,804 B1 | 11/2005 | Codilian |
| 6,967,820 B2 | 11/2005 | Horie et al. |
| 6,970,329 B1 | 11/2005 | Oveyssi et al. |
| 6,972,924 B1 | 12/2005 | Chen et al. |
| 6,972,926 B1 | 12/2005 | Codilian |
| 6,975,476 B1 | 12/2005 | Berding |
| 6,979,931 B1 | 12/2005 | Gustafson et al. |
| 6,980,391 B1 | 12/2005 | Haro |
| 6,980,401 B1 | 12/2005 | Narayanan et al. |
| 6,982,853 B1 | 1/2006 | Oveyssi et al. |
| 6,989,953 B1 | 1/2006 | Codilian |
| 6,990,727 B1 | 1/2006 | Butler et al. |
| 6,992,862 B2 | 1/2006 | Childers et al. |
| 6,996,893 B1 | 2/2006 | Ostrander et al. |
| 7,000,309 B1 | 2/2006 | Klassen et al. |
| 7,006,324 B1 | 2/2006 | Oveyssi et al. |
| 7,013,731 B1 | 3/2006 | Szeremeta et al. |
| 7,031,104 B1 | 4/2006 | Butt et al. |
| 7,035,050 B1 * | 4/2006 | Kulangara ............ G11B 5/4853 360/245.9 |
| 7,035,053 B1 | 4/2006 | Oveyssi et al. |
| 7,050,270 B1 | 5/2006 | Oveyssi et al. |
| 7,057,852 B1 | 6/2006 | Butler et al. |
| 7,062,837 B1 | 6/2006 | Butler |
| 7,064,921 B1 | 6/2006 | Yang et al. |
| 7,064,922 B1 | 6/2006 | Alfred et al. |
| 7,064,932 B1 | 6/2006 | Lin et al. |
| 7,075,701 B2 | 7/2006 | Novotny et al. |
| 7,085,098 B1 | 8/2006 | Yang et al. |
| 7,085,108 B1 | 8/2006 | Oveyssi et al. |
| 7,092,216 B1 | 8/2006 | Chang et al. |
| 7,092,251 B1 | 8/2006 | Henry |
| 7,099,099 B1 | 8/2006 | Codilian et al. |
| 7,099,117 B1 | 8/2006 | Subrahmanyam et al. |
| 7,113,371 B1 | 9/2006 | Hanna et al. |
| 7,142,397 B1 | 11/2006 | Venk |
| 7,145,753 B1 | 12/2006 | Chang et al. |
| 7,154,708 B2 | 12/2006 | Chhabra et al. |
| RE39,478 E | 1/2007 | Hatch et al. |
| 7,161,768 B1 | 1/2007 | Oveyssi |
| 7,161,769 B1 | 1/2007 | Chang et al. |
| 7,180,711 B1 | 2/2007 | Chang et al. |
| 7,193,819 B1 | 3/2007 | Chen et al. |
| 7,205,484 B2 | 4/2007 | Shiraishi et al. |
| 7,209,317 B1 | 4/2007 | Berding et al. |
| 7,209,319 B1 | 4/2007 | Watkins et al. |
| D542,289 S | 5/2007 | Diebel |
| 7,212,377 B1 | 5/2007 | Ou-Yang et al. |
| 7,215,513 B1 | 5/2007 | Chang et al. |
| 7,215,514 B1 | 5/2007 | Yang et al. |
| 7,224,551 B1 | 5/2007 | Ou-Yang et al. |
| D543,981 S | 6/2007 | Diebel |
| 7,227,725 B1 | 6/2007 | Chang et al. |
| 7,239,475 B1 | 7/2007 | Lin et al. |
| 7,245,458 B2 | 7/2007 | Zhang et al. |
| 7,271,978 B1 | 9/2007 | Santini et al. |
| 7,274,534 B1 | 9/2007 | Choy et al. |
| 7,280,311 B1 | 10/2007 | Ou-Yang et al. |
| 7,280,317 B1 | 10/2007 | Little et al. |
| 7,280,319 B1 | 10/2007 | McNab |
| 7,292,406 B1 | 11/2007 | Huang |
| 7,298,584 B1 | 11/2007 | Yamada et al. |
| 7,298,593 B2 | 11/2007 | Yao et al. |
| 7,327,537 B1 | 2/2008 | Oveyssi |
| 7,339,268 B1 | 3/2008 | Ho et al. |
| 7,342,746 B1 | 3/2008 | Lin |
| 7,344,060 B2 | 3/2008 | Koh |
| RE40,203 E | 4/2008 | Hatch et al. |
| 7,353,524 B1 | 4/2008 | Lin et al. |
| 7,359,154 B2 | 4/2008 | Yao et al. |
| 7,369,368 B1 | 5/2008 | Mohajerani |
| 7,372,669 B2 | 5/2008 | Deguchi et al. |
| 7,372,670 B1 | 5/2008 | Oveyssi |
| 7,375,874 B1 | 5/2008 | Novotny et al. |
| 7,375,929 B1 | 5/2008 | Chang et al. |
| 7,379,266 B1 | 5/2008 | Ou-Yang et al. |
| 7,381,904 B1 | 6/2008 | Codilian |
| 7,385,784 B1 | 6/2008 | Berding et al. |
| 7,388,731 B1 | 6/2008 | Little et al. |
| 7,388,733 B2 | 6/2008 | Swanson et al. |
| 7,394,139 B2 | 7/2008 | Park et al. |
| 7,414,814 B1 | 8/2008 | Pan |
| 7,420,771 B1 | 9/2008 | Hanke et al. |
| 7,434,987 B1 | 10/2008 | Gustafson et al. |
| 7,436,625 B1 | 10/2008 | Chiou et al. |
| 7,440,234 B1 | 10/2008 | Cheng et al. |
| 7,440,236 B1 | 10/2008 | Bennin et al. |
| 7,450,346 B2 | 11/2008 | Arya et al. |
| 7,477,488 B1 | 1/2009 | Zhang et al. |
| 7,477,489 B1 | 1/2009 | Chen et al. |
| 7,482,800 B2 | 1/2009 | Ooyabu et al. |
| 7,484,291 B1 | 2/2009 | Ostrander et al. |
| 7,505,231 B1 | 3/2009 | Golgolab et al. |
| 7,515,240 B2 | 4/2009 | Lu et al. |
| 7,518,830 B1 | 4/2009 | Panchal et al. |
| 7,525,767 B2 | 4/2009 | Erpelding |
| 7,525,769 B2 | 4/2009 | Yao et al. |
| 7,529,064 B1 | 5/2009 | Huang et al. |
| 7,538,981 B1 | 5/2009 | Pan |
| 7,561,374 B1 | 7/2009 | Codilian |
| 7,567,410 B1 | 7/2009 | Zhang et al. |
| 7,576,955 B1 | 8/2009 | Yang et al. |
| 7,593,181 B1 | 9/2009 | Tsay et al. |
| 7,605,999 B1 | 10/2009 | Kung et al. |
| 7,609,486 B1 | 10/2009 | Little |
| 7,610,672 B1 | 11/2009 | Liebman |
| 7,616,408 B2 | 11/2009 | Choi et al. |
| 7,633,721 B1 | 12/2009 | Little et al. |
| 7,633,722 B1 | 12/2009 | Larson et al. |
| 7,652,890 B2 | 1/2010 | Ohsawa et al. |
| 7,656,609 B1 | 2/2010 | Berding et al. |
| 7,660,075 B1 | 2/2010 | Lin et al. |
| 7,672,083 B1 | 3/2010 | Yu et al. |
| 7,684,155 B1 | 3/2010 | Huang et al. |
| 7,686,555 B1 | 3/2010 | Larson et al. |
| 7,697,102 B2 | 4/2010 | Hirakata et al. |
| 7,709,078 B1 | 5/2010 | Sevier et al. |
| 7,715,149 B1 | 5/2010 | Leibman et al. |
| 7,729,091 B1 | 6/2010 | Huang et al. |
| 7,751,145 B1 | 7/2010 | Lin et al. |
| 7,764,467 B2 | 7/2010 | Hanya et al. |
| 7,826,177 B1 | 11/2010 | Zhang et al. |
| 7,852,601 B1 | 12/2010 | Little |
| 7,864,488 B1 | 1/2011 | Pan |
| 7,876,664 B2 | 1/2011 | Tsukagoshi et al. |
| 7,898,770 B1 | 3/2011 | Zhang et al. |
| 7,903,369 B1 | 3/2011 | Codilian et al. |
| 7,907,369 B1 | 3/2011 | Pan |
| 7,911,742 B1 | 3/2011 | Chang et al. |
| 7,926,167 B1 | 4/2011 | Liebman et al. |
| 7,957,095 B1 | 6/2011 | Tsay et al. |
| 7,957,102 B1 | 6/2011 | Watson et al. |
| 7,961,436 B1 | 6/2011 | Huang et al. |
| 8,004,782 B1 | 8/2011 | Nojaba et al. |
| 8,009,384 B1 | 8/2011 | Little |
| 8,015,692 B1 | 9/2011 | Zhang et al. |
| 8,018,687 B1 | 9/2011 | Little et al. |
| 8,030,576 B2 | 10/2011 | Kamei et al. |
| 8,031,431 B1 | 10/2011 | Berding et al. |
| 8,064,168 B1 | 11/2011 | Zhang et al. |
| 8,064,170 B1 | 11/2011 | Pan |

(56) References Cited

U.S. PATENT DOCUMENTS

| | | |
|---|---|---|
| 8,068,314 B1 | 11/2011 | Pan et al. |
| 8,081,401 B1 | 12/2011 | Huang et al. |
| 8,100,017 B1 | 1/2012 | Blick et al. |
| 8,111,483 B2 | 2/2012 | Arai |
| 8,116,038 B1 | 2/2012 | Zhang et al. |
| 8,120,872 B2 | 2/2012 | Sekii et al. |
| 8,125,740 B1 | 2/2012 | Yang et al. |
| 8,142,671 B1 | 3/2012 | Pan |
| 8,156,633 B1 | 4/2012 | Foisy |
| 8,159,785 B1 | 4/2012 | Lee et al. |
| 8,169,746 B1 | 5/2012 | Rice et al. |
| 8,189,298 B1 | 5/2012 | Lee et al. |
| 8,194,348 B2 | 6/2012 | Jacoby et al. |
| 8,194,354 B1 | 6/2012 | Zhang et al. |
| 8,194,355 B1 | 6/2012 | Pan et al. |
| 8,203,806 B2 | 6/2012 | Larson et al. |
| 8,223,453 B1 | 7/2012 | Norton et al. |
| 8,228,631 B1 | 7/2012 | Tsay et al. |
| 8,233,239 B1 | 7/2012 | Teo et al. |
| 8,248,733 B1 | 8/2012 | Radavicius et al. |
| 8,259,417 B1 | 9/2012 | Ho et al. |
| 8,274,760 B1 | 9/2012 | Zhang et al. |
| 8,276,256 B1 | 10/2012 | Zhang et al. |
| 8,279,560 B1 | 10/2012 | Pan |
| 8,284,514 B1 | 10/2012 | Garbarino |
| 8,289,646 B1 | 10/2012 | Heo et al. |
| 8,295,013 B1 | 10/2012 | Pan et al. |
| 8,295,014 B1 | 10/2012 | Teo et al. |
| 8,300,352 B1 | 10/2012 | Larson et al. |
| 8,305,708 B2 | 11/2012 | Tacklind |
| 8,320,084 B1 | 11/2012 | Shum et al. |
| 8,320,086 B1 | 11/2012 | Moradnouri et al. |
| 8,322,021 B1 | 12/2012 | Berding et al. |
| 8,325,446 B1 | 12/2012 | Liu et al. |
| 8,325,447 B1 | 12/2012 | Pan |
| 8,339,748 B2 | 12/2012 | Shum et al. |
| 8,345,387 B1 | 1/2013 | Nguyen |
| 8,363,351 B1 | 1/2013 | Little |
| 8,363,353 B2 | 1/2013 | Yawata |
| 8,369,044 B2 | 2/2013 | Howie et al. |
| 8,411,389 B1 | 4/2013 | Tian et al. |
| 8,416,522 B1 | 4/2013 | Schott et al. |
| 8,416,524 B2 | 4/2013 | Saichi et al. |
| 8,416,534 B1 | 4/2013 | Heo et al. |
| 8,422,171 B1 | 4/2013 | Guerini |
| 8,422,175 B1 | 4/2013 | Oveyssi |
| 8,432,641 B1 | 4/2013 | Nguyen |
| 8,437,101 B1 | 5/2013 | German et al. |
| 8,438,721 B1 | 5/2013 | Sill |
| 8,446,688 B1 | 5/2013 | Quines et al. |
| 8,451,559 B1 | 5/2013 | Berding et al. |
| 8,467,153 B1 | 6/2013 | Pan |
| 8,472,131 B1 | 6/2013 | Ou-Yang et al. |
| 8,477,459 B1 | 7/2013 | Pan |
| 8,477,460 B1 | 7/2013 | Liebman |
| 8,488,270 B2 | 7/2013 | Brause et al. |
| 8,488,280 B1 | 7/2013 | Myers et al. |
| 8,499,652 B1 | 8/2013 | Tran et al. |
| 8,514,514 B1 | 8/2013 | Berding et al. |
| 8,530,032 B1 | 9/2013 | Sevier et al. |
| 8,542,465 B2 | 9/2013 | Liu et al. |
| 8,547,664 B1 | 10/2013 | Foisy et al. |
| 8,553,356 B1 | 10/2013 | Heo et al. |
| 8,553,366 B1 | 10/2013 | Hanke |
| 8,553,367 B1 | 10/2013 | Foisy et al. |
| 8,564,909 B1 | 10/2013 | Dunn et al. |
| 8,611,052 B1 | 12/2013 | Pan et al. |
| 8,616,900 B1 | 12/2013 | Lion |
| 8,665,555 B1 | 3/2014 | Young et al. |
| 8,665,566 B1 | 3/2014 | Pan et al. |
| 8,667,667 B1 | 3/2014 | Nguyen et al. |
| 8,693,139 B2 | 4/2014 | Tian et al. |
| 8,693,140 B1 | 4/2014 | Weiher et al. |
| 8,699,179 B1 | 4/2014 | Golgolab et al. |
| 8,702,998 B1 | 4/2014 | Guerini |
| 8,705,201 B2 | 4/2014 | Casey et al. |
| 8,705,209 B2 | 4/2014 | Seymour et al. |
| 8,711,521 B2 | 4/2014 | Feng et al. |
| 8,717,706 B1 | 5/2014 | German et al. |
| 8,743,509 B1 | 6/2014 | Heo et al. |
| 8,755,148 B1 | 6/2014 | Howie et al. |
| 8,756,776 B1 | 6/2014 | Chen et al. |
| 8,760,800 B1 | 6/2014 | Brown et al. |
| 8,760,812 B1 | 6/2014 | Chen et al. |
| 8,760,814 B1 | 6/2014 | Pan et al. |
| 8,760,816 B1 | 6/2014 | Myers et al. |
| 8,773,812 B1 | 7/2014 | Gustafson et al. |
| 8,780,491 B1 | 7/2014 | Perlas et al. |
| 8,780,504 B1 | 7/2014 | Teo et al. |
| 8,792,205 B1 | 7/2014 | Boye-Doe et al. |
| 8,797,677 B2 | 8/2014 | Heo et al. |
| 8,797,689 B1 | 8/2014 | Pan et al. |
| 8,824,095 B1 | 9/2014 | Dougherty |
| 8,824,098 B1 | 9/2014 | Huang et al. |
| 2001/0017749 A1 | 8/2001 | Stefansky |
| 2005/0030670 A1 | 2/2005 | Ando et al. |
| 2005/0243472 A1 | 11/2005 | Kamigama et al. |
| 2006/0098347 A1 | 5/2006 | Yao et al. |
| 2006/0146262 A1 | 7/2006 | Yu et al. |
| 2006/0157869 A1 | 7/2006 | Huang et al. |
| 2007/0227768 A1 | 10/2007 | Shin |
| 2007/0246251 A1 | 10/2007 | Shiraishi et al. |
| 2008/0002303 A1 | 1/2008 | Wang et al. |
| 2008/0005896 A1 | 1/2008 | Yeh et al. |
| 2008/0068757 A1 | 3/2008 | Kamigama et al. |
| 2008/0088975 A1 | 4/2008 | Bennin et al. |
| 2008/0225439 A1 | 9/2008 | Komura |
| 2009/0151994 A1 | 6/2009 | Ohsawa et al. |
| 2009/0207529 A1 | 8/2009 | Yao |
| 2009/0211789 A1 | 8/2009 | Yeates et al. |
| 2009/0253233 A1 | 10/2009 | Chang et al. |
| 2010/0007993 A1 | 1/2010 | Contreras et al. |
| 2010/0118444 A1 | 5/2010 | Rothenberg et al. |
| 2010/0176827 A1 | 7/2010 | Yamazaki et al. |
| 2010/0188778 A1 | 7/2010 | Castagna |
| 2010/0195474 A1 | 8/2010 | Tsukuda et al. |
| 2010/0220414 A1 | 9/2010 | Klarqvist et al. |
| 2011/0122530 A1 | 5/2011 | Sekii et al. |
| 2011/0212281 A1 | 9/2011 | Jacoby et al. |
| 2011/0317309 A1 | 12/2011 | Shum et al. |
| 2012/0067626 A1 | 3/2012 | Mizutani |
| 2012/0200957 A1 | 8/2012 | Yawata |
| 2013/0038964 A1 | 2/2013 | Garbarino et al. |
| 2013/0050872 A1 | 2/2013 | Sekii et al. |
| 2013/0091698 A1 | 4/2013 | Banshak, Jr. et al. |
| 2013/0155546 A1 | 6/2013 | Heo et al. |
| 2013/0290988 A1 | 10/2013 | Watson et al. |

OTHER PUBLICATIONS

Notice of Allowance dated Apr. 11, 2012 from U.S. Appl. No. 13/078,829, 22 pages.
Notice of Allowance dated May 21, 2012 from U.S. Appl. No. 13/164,936, 17 pages.
Notice of Allowance dated May 21, 2012 from U.S. Appl. No. 13/398,578, 16 pages.
Notice of Allowance dated May 29, 2012 from U.S. Appl. No. 13/164,959, 17 pages.
Notice of Allowance dated Feb. 20, 2013 from U.S. Appl. No. 12/916,237, 7 pages.
Office Action dated May 22, 2012 from U.S. Appl. No. 12/916,237, 8 pages.
Tzong-Shii Pan, et al., U.S. Appl. No. 13/897,609, filed May 20, 2013, 23 pages.
Tzong-Shii Pan, et al., U.S. Appl. No. 12/916,237, filed Oct. 29, 2010, 23 pages.

* cited by examiner

DISK DRIVE SYSTEM

CROSS-REFERENCE TO RELATED APPLICATIONS

This application is a Divisional of and is based upon and claims the benefit of priority under 35 U.S.C. §120 for U.S. Ser. No. 14/492,266, filed Sep. 22, 2014 and claims benefit as a continuation-in-part of pending U.S. patent application Ser. No. 13/897,609, filed May 20, 2013, entitled "Disk drive head gimbal assembly having a flexure tail with folded bond pads," which is itself is a divisional of U.S. patent application Ser. No. 12/916,237, filed Oct. 29, 2010, entitled "Disk drive head gimbal assembly having a flexure tail with folded bond pads," (issued as U.S. Pat. No. 8,467,153), and to which priority is also claimed through the chain of priority.

BACKGROUND

Information storage devices are used to retrieve and/or store data in computers and other consumer electronics devices. A magnetic hard disk drive is an example of an information storage device that includes one or more heads that can both read and write, but other information storage devices also include heads—sometimes including heads that cannot write. A head that can read may be referred to as a "read head" herein, even if it includes other structures and functions such as a transducer for writing, a heater, microactuator, electronic lapping guide, laser diode, etc.

In a modern magnetic hard disk drive device, each head is a sub-component of a head-gimbal assembly (HGA) that typically includes a laminated flexure to carry the electrical signals to and from the head. The HGA, in turn, is a sub-component of a head-stack assembly (HSA) that typically includes a plurality of HGAs, an actuator, and a flexible printed circuit (FPC). The plurality of HGAs are attached to various arms of the actuator.

Modern laminated flexures typically include conductive copper traces that are isolated from a stainless steel structural layer by a polyimide dielectric layer. So that the signals from/to the head can reach the FPC on the actuator body, each HGA flexure includes a flexure tail that extends away from the head along a corresponding actuator arm and ultimately attaches to the FPC adjacent the actuator body. That is, the flexure includes traces that extend from adjacent the head and continue along the flexure tail to electrical connection points. The FPC includes conductive electrical terminals that correspond to the electrical connection points of the flexure tail.

To facilitate electrical connection of the conductive traces of the flexure tails to the conductive electrical terminals of the FPC during the HSA manufacturing process, the flexure tails must first be properly positioned relative to the FPC so that the conductive traces of the flexure tails are aligned with the conductive electrical terminals of the FPC. Then the flexure tails must be held or constrained against the conductive electrical terminals of the FPC while the aforementioned electrical connections are made by ultrasonic bonding, solder jet bonding, solder bump reflow, or anisotropic conductive film (ACF) bonding.

Modern magnetic read heads are trending to include more and more additional structures and functions that require electrical connection. For example, electrical connections to the read head may be required for the read transducer (e.g. a tunneling magnetoresistive sensor), a write transducer (e.g. an inductive writer), a heater for dynamic flying height control, a microactuator for fine tracking control, an electronic lapping guide to enhance control of a head fabrication step, and/or a laser diode to heat a local region of an adjacent disk for so-called heat assisted magnetic recording. However, contemporary flexure tails have very little space in their bonding region for additional conductive layer traces, especially since contemporary flexure tails also include flexure bond pads in the conductive layer.

Certain past flexure tail designs have accommodated an increase in the number of electrical connections by adding a second conductive layer (e.g. a second copper layer) in addition to the needed structural layer (e.g. stainless steel) and the first conductive layer (e.g. the copper layer that includes the flexure bond pads). However, such an addition of a second conductive layer increases the cost and complexity of the flexure tail. Hence, there is a need in the art for a new flexure tail design that can accommodate an increased number of traces in a first conductive layer.

DESCRIPTION OF THE PREFERRED EMBODIMENTS

Figure 1:
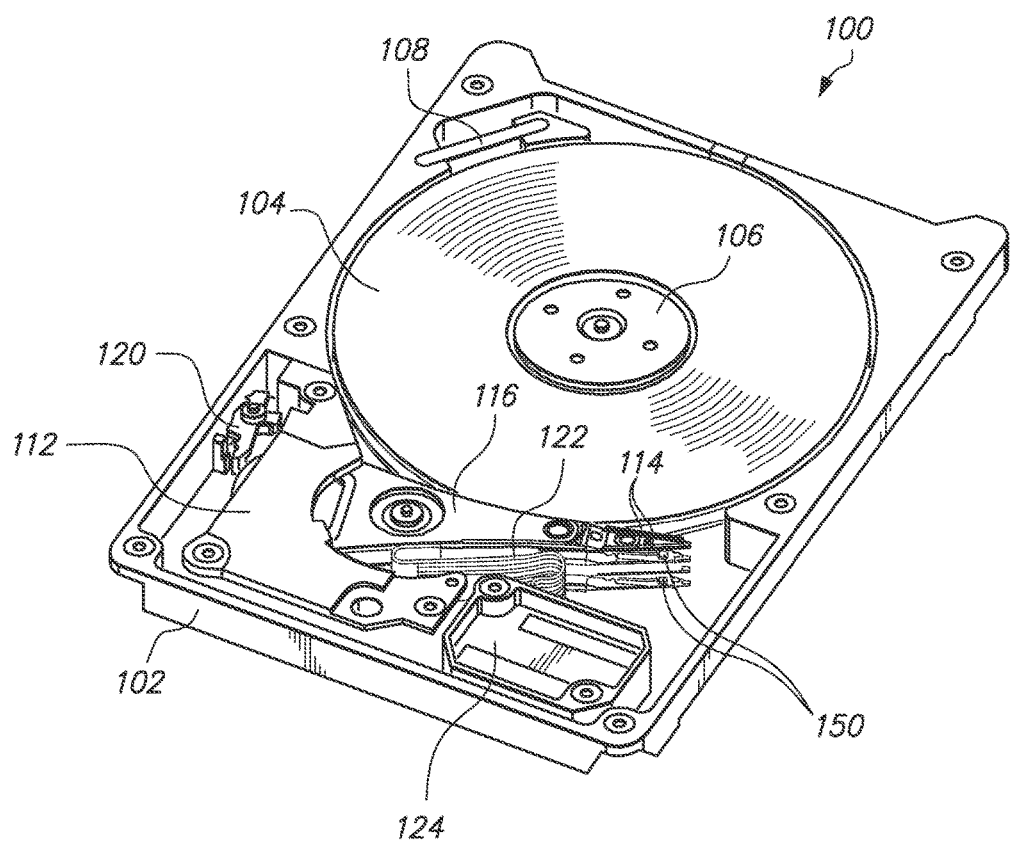
FIG. 1 is a top perspective view of a disk drive capable of including an embodiment of the present invention.

FIG. 1 is a top perspective view of a disk drive 100 capable of including an embodiment of the present invention. The disk drive 100 includes a disk drive base 102 and two annular magnetic disks 104. The disk drive 100 further includes a spindle 106, rotatably mounted on the disk drive base 102, for rotating the disks 104. The rotation of the disks 104 establishes air flow through recirculation filter 108. In other embodiments, disk drive 100 may have only a single disk, or alternatively, more than two disks.

The disk drive 100 further includes an actuator 116 that is pivotably mounted on disk drive base 102. Voice coil motor 112 pivots the actuator 116 through a limited angular range so that at least one head gimbal assembly (HGA) 114 is desirably positioned relative to one or more tracks of information on a corresponding one of the disks 104. In the embodiment of FIG. 1, the actuator 116 includes three arms upon which four HGAs 114 are attached, each corresponding to a surface of one of the two disks 104. However in other embodiments fewer or more HGAs 114 may be included depending on the number of disks 104 that are included and whether the disk drive 100 is depopulated.

Each HGA 114 preferably includes a read head 150 for reading and writing from/to one of the disks 104. The head 150 may be referred to herein as a read head, even though it may also perform other functions and contain other structures such as a writer for writing data, a microactuator, a heater, a laser, a lapping guide, etc. The actuator 116 may occasionally be latched at an extreme angular position within the limited angular range, by latch 120. Electrical signals to/from the HGAs 114 are carried to other drive electronics via a flexible printed circuit that includes a flex cable 122 (preferably including a preamplifier circuit) and flex cable bracket 124.

Figure 2:
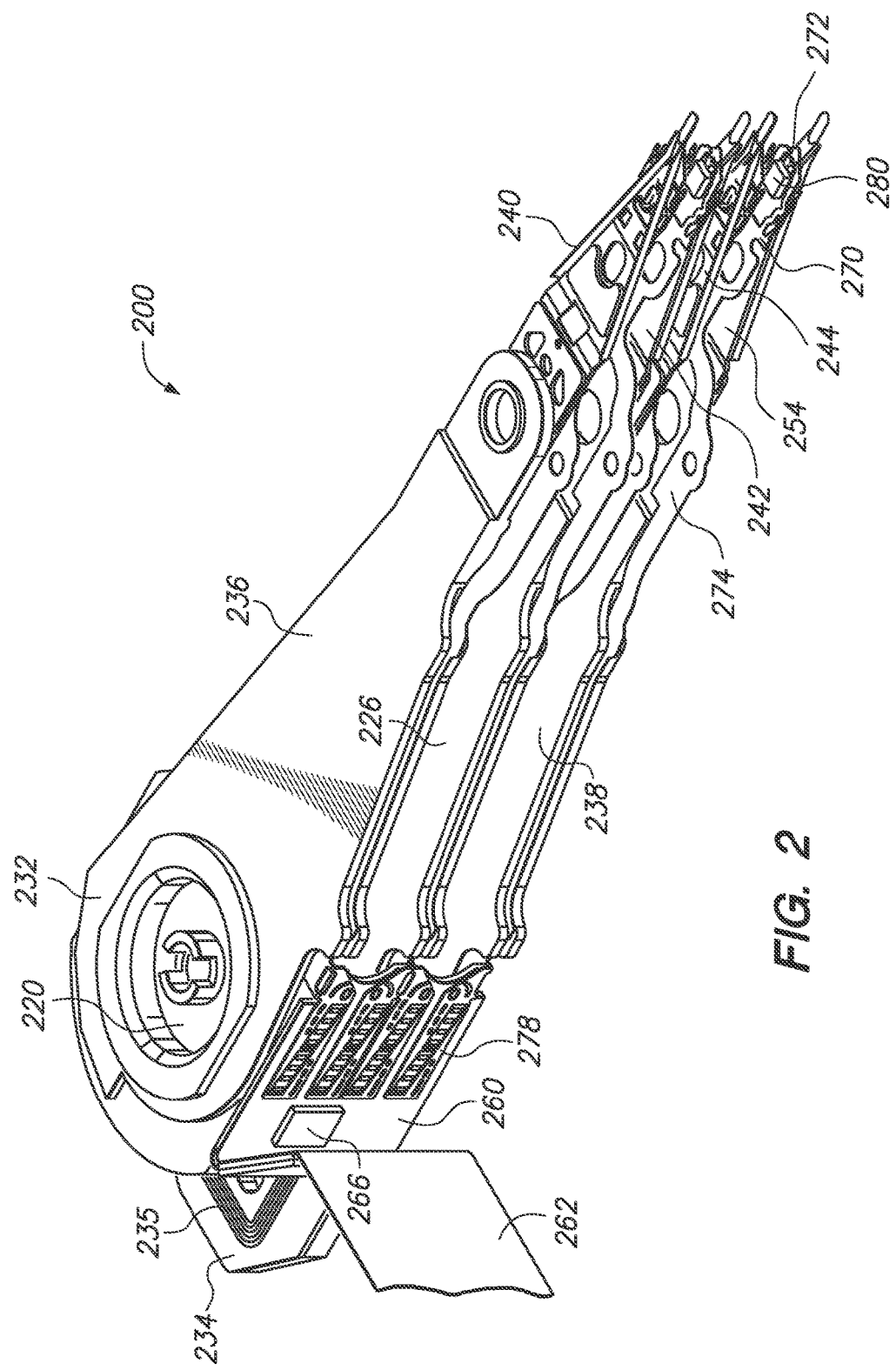
FIG. 2 is a perspective view of a head stack assembly (HSA) capable of including an embodiment of the present invention.

FIG. 2 is a perspective view of a head stack assembly (HSA) 200 capable of including an embodiment of the present invention. The HSA 200 includes an actuator body 232 and a plurality of actuator arms 226, 236, 238 extending from the actuator body 232. The actuator body 232 includes a pivot bearing cartridge 220 disposed in the actuator bore, and a coil support 234 that supports a coil 235 and extends from the actuator body 232 in a direction that is generally opposite the actuator arms 226, 236, 238. The HSA 200 also includes a plurality of head gimbal assemblies (HGA) 240, 242, 244, 254, attached to the actuator arms 226, 236, 238. For example, such attachment may be made by swaging. Note that the inner actuator arm 226 includes two HGAs 242, 244, while each of the outer actuator arms 236, 238, includes only one HGA. This is because in a fully populated disk drive the inner arms are positioned between disk surfaces while the outer actuator arms are positioned over (or under) a single disk surface. In a depopulated disk drive, however, any of the actuator arms may have one or zero HGAs, possibly replaced by a dummy mass.

Each HGA includes a read head for reading and/or writing to an adjacent disk surface (e.g. HGA 254 includes read head 280). The read head 280 is attached to a tongue portion 272 of a laminated flexure 270. The laminated flexure 270 is part of the HGA 254, and is attached to a load beam (the part of the HGA 254 to which the numerical label 254 points). The laminated flexure 270 may include a structural layer (e.g. stainless steel), a dielectric layer (e.g. polyimide), and a conductive layer into which traces are patterned (e.g. copper). The HSA 200 also includes a flexible printed circuit (FPC) 260 adjacent the actuator body 232. The FPC 260 includes a flex cable 262 and a preamplifier 266. The FPC 260 may comprise a laminate that includes two or more conventional dielectric and conductive layer materials (e.g. one or more polymeric materials, copper, etc.). The laminated flexure 270 includes a flexure tail 274 that runs along the actuator arm 238 to a terminal region 278 of the laminated flexure 270 that is electrically connected to bond pads of the FPC 260.

Methods of electrical connection of the flexure tails (e.g. flexure tail 274) to the FPC 260 include ultrasonic bonding of gold coatings thereon, solder reflow, solder ball jet (SBJ), and anisotropic conductive film (ACF) bonding, and are preferably but not necessarily automated. To electrically connect and securely attach the flexure tails to the FPC 260, the flexure tails are first aligned with the FPC 260, and then pressed against the FPC 260 (at least temporarily) while electrical connection is established and secure attachment is completed. Maintaining alignment and sufficient uniform pressure and temperature to groups of bond pads may be desirable during this process.

Figure 3:
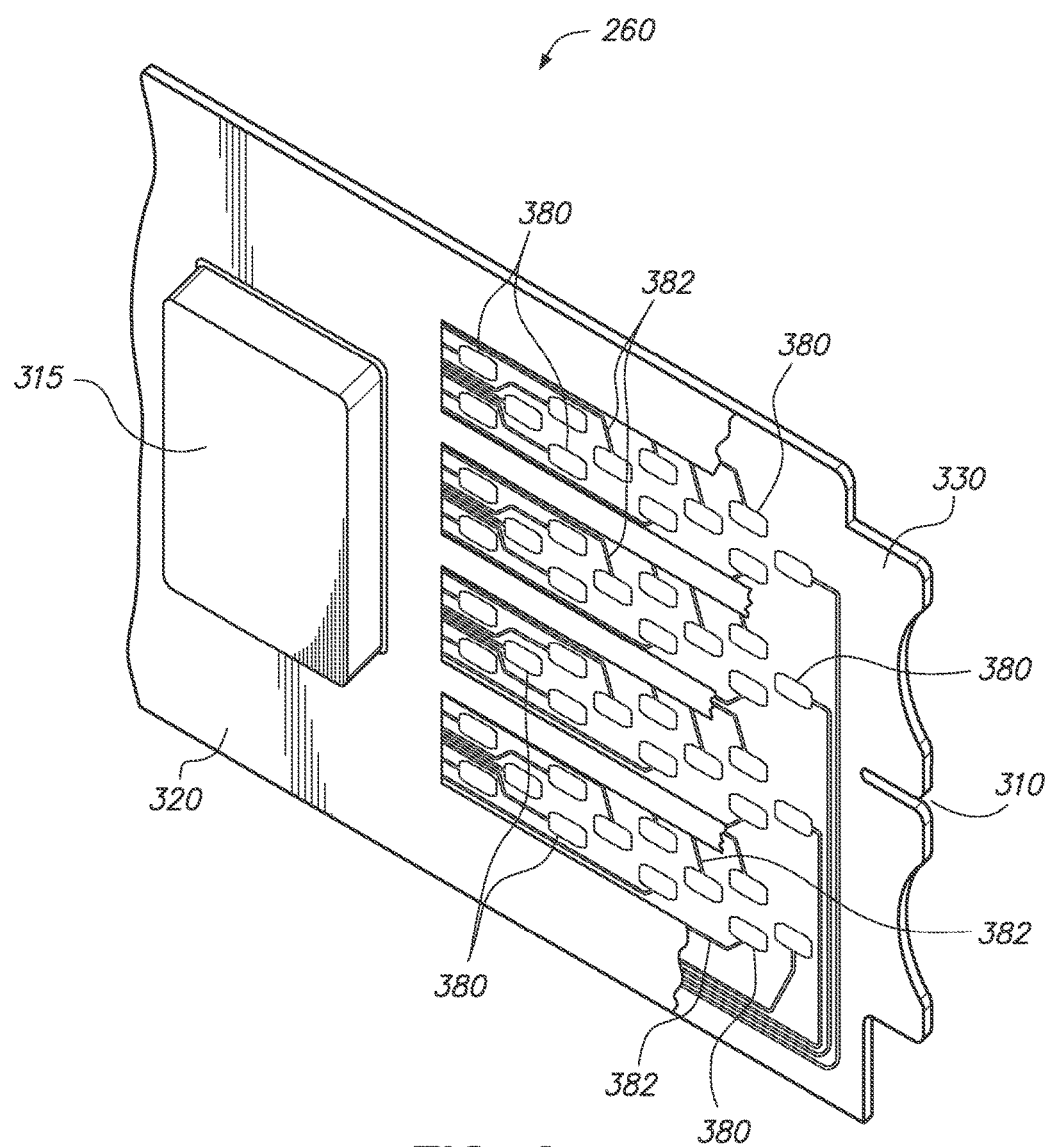
FIG. 3 is a perspective view of a portion of a flexible printed circuit (FPC) for use with an embodiment of the present invention.

FIG. 3 depicts the FPC 260 before flexure tail terminal regions (i.e. the portion of each flexure tail that overlaps the FPC 260, for example, flexure tail terminal region 278) are bonded thereto. The FPC 260 includes electrical conduits 382 that terminate at FPC bond pads 380, which are aligned with and connected to flexure bond pads of the terminal regions (e.g. flexure tail terminal region 278) of the HGA flexure tails. The FPC electrical conduits 382 may comprise copper and may connect to a pre-amplifier chip 315. Two of the HGA flexure tails may pass through the FPC slit 310 to help facilitate their support and alignment.

The FPC 260 may include an optional insulative cover layer 320 having windows exposing the regions where the flexure tail terminal regions and the pre-amplifier chip 315 are bonded thereto. The cover layer 320 is shown cut away in the view of FIG. 3, so that the electrical conduits 382 can be better depicted. The FPC 260 may also include an insulative substrate 330 upon which the FPC electrical conduits 382 are deposited.

Figure 4A:
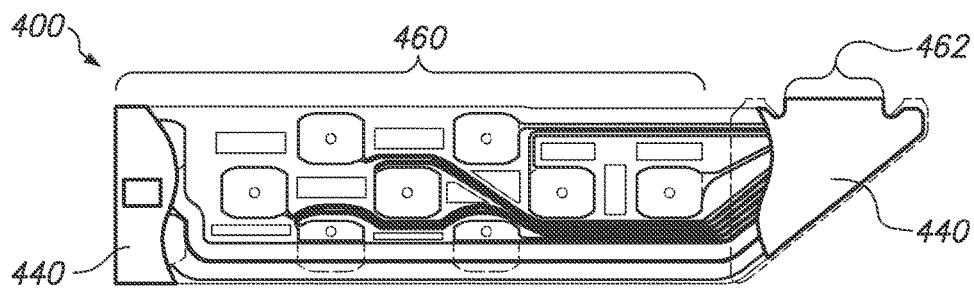
FIG. 4A depicts a flexure tail terminal region according to an embodiment of the present invention.
Figure 4B:
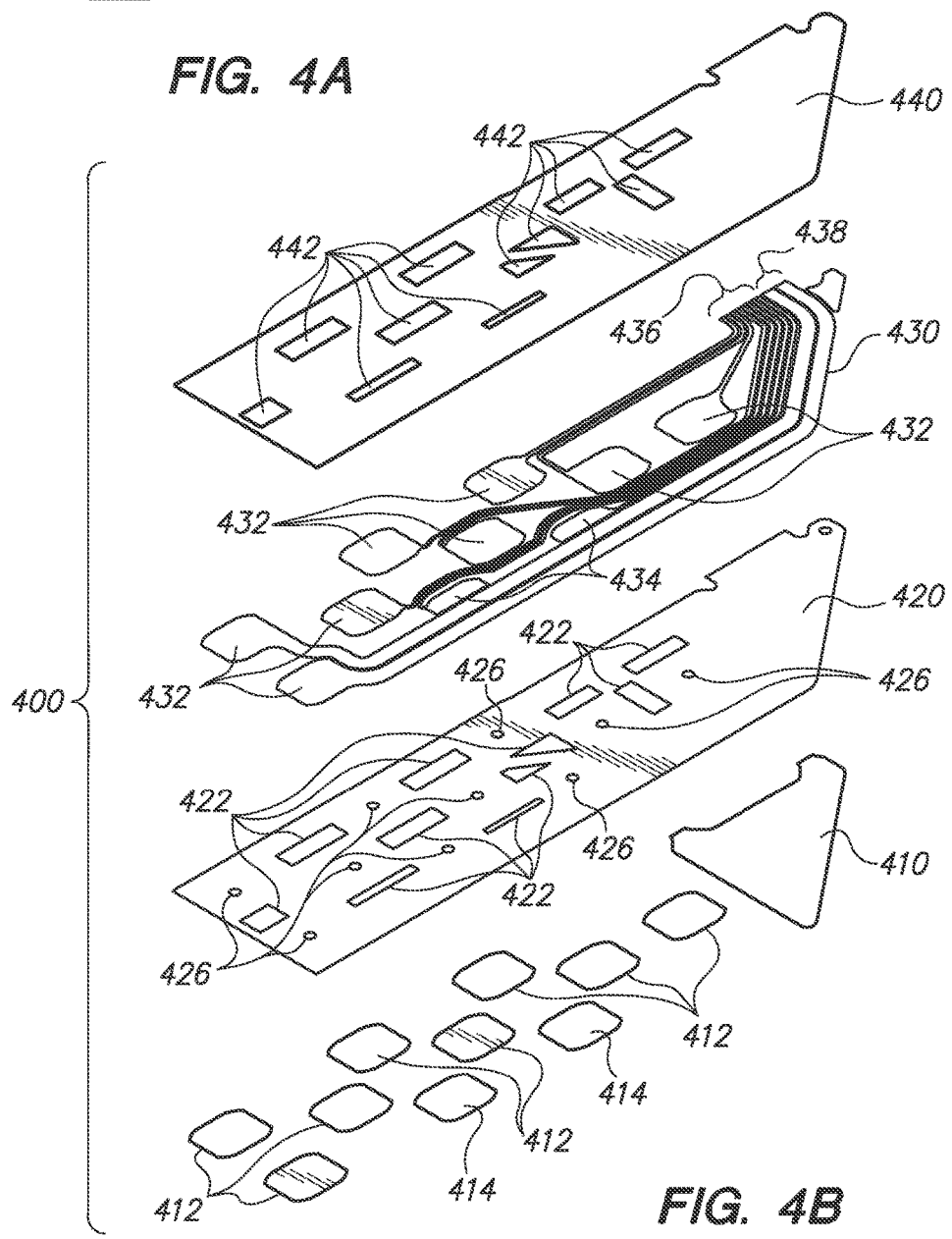
FIG. 4B is an exploded view of the flexure tail of FIG. 4A.

FIG. 4A depicts the terminal region of a flexure tail 400 according to an embodiment of the present invention. FIG. 4B is an exploded view of the terminal region of flexure tail 400. Now referring to FIGS. 4A and 4B, the laminated flexure 400 includes a metallic conductive layer 430 (e.g. copper) that includes a plurality of electrically conductive traces 436, 438 that are elongated and narrow and electrically connected to the read head (e.g. read head 280 of FIG. 2). The laminated flexure 400 also includes a metallic structural layer 410 (e.g. stainless steel) that is stiffer than the conductive layer 430. A first dielectric layer 420 (e.g. polyimide) is disposed between the structural layer 410 and the conductive layer 430. A second dielectric layer 440 (e.g. polyimide) substantially covers the conductive layer 430 in a flexure tail bonding region 460 (the region that overlaps the FPC). Note that the second dielectric layer 440 is shown partially cut away in the view of FIG. 4A, so that underlying features can be visible.

In the embodiment of FIGS. 4A and 4B, the structural layer 410 includes a plurality of flexure bond pads 412, 414 in the flexure tail bonding region 460. Each of the plurality of flexure bond pads 412, 414 in the structural layer 410 are configured to be aligned with, face, and be bonded to a corresponding one of a plurality of FPC bond pads (e.g. like FPC bond pads 380 of FIG. 3). Note that in the embodiment of FIGS. 4A and 4B, the flexure tail must be routed and bent (at bend location 462) so that the structural layer 410 faces the FPC, in contravention of the conventional practice of bending the flexure tail so that the conductive layer 430 (in areas exposed by a cover layer) faces the FPC. As will be described subsequently herein, some alternative embodiments of the present invention are compatible with conventional routing and bending of the flexure tails.

In the embodiment of FIGS. 4A and 4B, each of the plurality of flexure bond pads 412, 414 in the structural layer 410 is electrically connected to a corresponding one of the plurality of electrically conductive traces 436, 438 in the conductive layer 430 by one of a first plurality of vias 426 through the first dielectric layer 420. Each of the first plurality of vias 426 through the first dielectric layer 420 may optionally comprise a hole through the first dielectric layer 420 that is filled with an electrically conductive material contacting a widened via connection land 432 or 434 in the conductive layer 430. Note that the vias 426 are too small to be practically depicted with dashed lines in FIG. 4A, though they are underlying features obscured by the conductive layer in FIG. 4A.

Advantageously, in the embodiment of FIGS. 4A and 4B the via connection lands 432, 434 need not be as large as the bond pads 412, 414 in the structural layer 410, because the via connection lands 432, 434 need not match the footprint of the FPC bond pads or be large enough to accommodate the solder or adhesive for bonding thereto. Therefore, more space can be made available for the traces 436, 438 in the conductive layer 430 than in conventional flexure tail designs. For example, the smaller size of the via connection lands 434 (relative to the corresponding bond pads 414) allows more space for the traces 438 in the conductive layer 430.

In the embodiment of FIGS. 4A and 4B, each of the flexure bond pads 412, 414 in the structural layer 410 may optionally include a gold coating, for example to help facilitate bonding to FPC bond pads. Note that the bonding region 460 of the flexure 400 may optionally include a plurality of windows 422 through the first dielectric layer 420 and a corresponding plurality of windows 442 through the second dielectric layer 440, for example to control the spread of adhesive or solder during bonding. In the embodiment of FIGS. 4A and 4B, the windows 422 and 442 are preferably but not necessarily located where they will not expose any portion of the patterned conductive layer 430.

Now referring to FIGS. 3, 4A, and 4B, each of the flexure bond pads 412, 414 of the structural layer 410 may be bonded to a corresponding one of a plurality of FPC bond pads 380 optionally by an anisotropic conductive film (ACF) that includes an adhesive doped with a plurality of electrically conductive beads of substantially similar diameter. In certain embodiments the ACF may employ beads of non-spherical shape, such as cylindrical beads. In certain embodiments the adhesive may be deposited on to the FPC bond pads 380 prior to aligning the flexure bond pads 412, 414 thereto. Alternatively, the adhesive material may be deposited on to the flexure bond pads 412, 414 (facing the FPC bond pad 380) prior to bringing a thermode tool into contact with the second dielectric layer 440 (facing away from the FPC bond pads 380) to press the flexure 400 against the FPC 260 in the bonding region 460 for a period. The thermode tool may optionally include a flat surface that is substantially larger than any of the plurality of flexure bond pads 412, 414. Preferably but not necessarily, the pressure between the flexure bond pads 412, 414 and the FPC bond pads 380 during the period of bonding may arrange the plurality of electrically conductive beads in a monolayer with each of the plurality of electrically conductive beads in electrical contact with a flexure bond pad 412, 414 and the corresponding FPC bond pad 380. The thermode tool may also transfer heat through the flexure 400 during the period of bonding, and raise the temperature of the adhesive material during such period, for example to accelerate curing of the adhesive material.

In certain embodiments, the force applied by the thermode is sufficient to cause the electrically conductive beads to be substantially elastically deformed in compression between the flexure bond pads 412, 414 and the corresponding FPC bond pads 380 during the period of thermal curing of the adhesive material. After the thermode tool is removed, the electrically conductive beads cool (with the cured adhesive) from an elevated curing temperature. Such cooling causes the electrically conductive beads to shrink relative to their expanded size during thermal curing of the adhesive material.

However, the force is preferably chosen to be great enough that the post-curing shrinkage of the electrically conductive beads cannot completely relieve the compressive deformation of the electrically conductive beads that was experienced during curing. Hence, after curing of the adhesive material, and after removal of the thermode tool, the electrically conductive beads may remain in compression (and somewhat compressively deformed) between the flexure bond pads 412, 414 and the corresponding FPC bond pad 380.

Although residual compression of the electrically conductive beads may correspond to some residual tension in the cured adhesive material, such residual compression of the electrically conductive beads may be desirable to enhance and ensure reliable electrical conductivity of the ACF. For example, in the case where the electrically conductive beads are spherical, the residual compression may cause small flat spots that can provide finite contact areas rather than point contacts, which may desirably reduce the electrical resistance of the ACF.

Figure 5A:
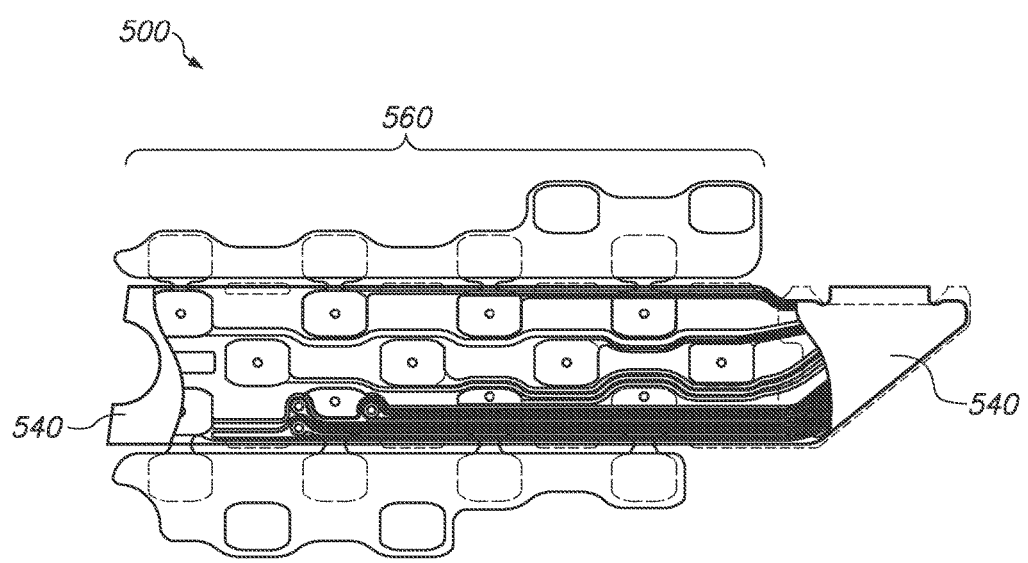
FIG. 5A depicts a flexure tail terminal region before folding, according to another embodiment of the present invention.
Figure 5B:
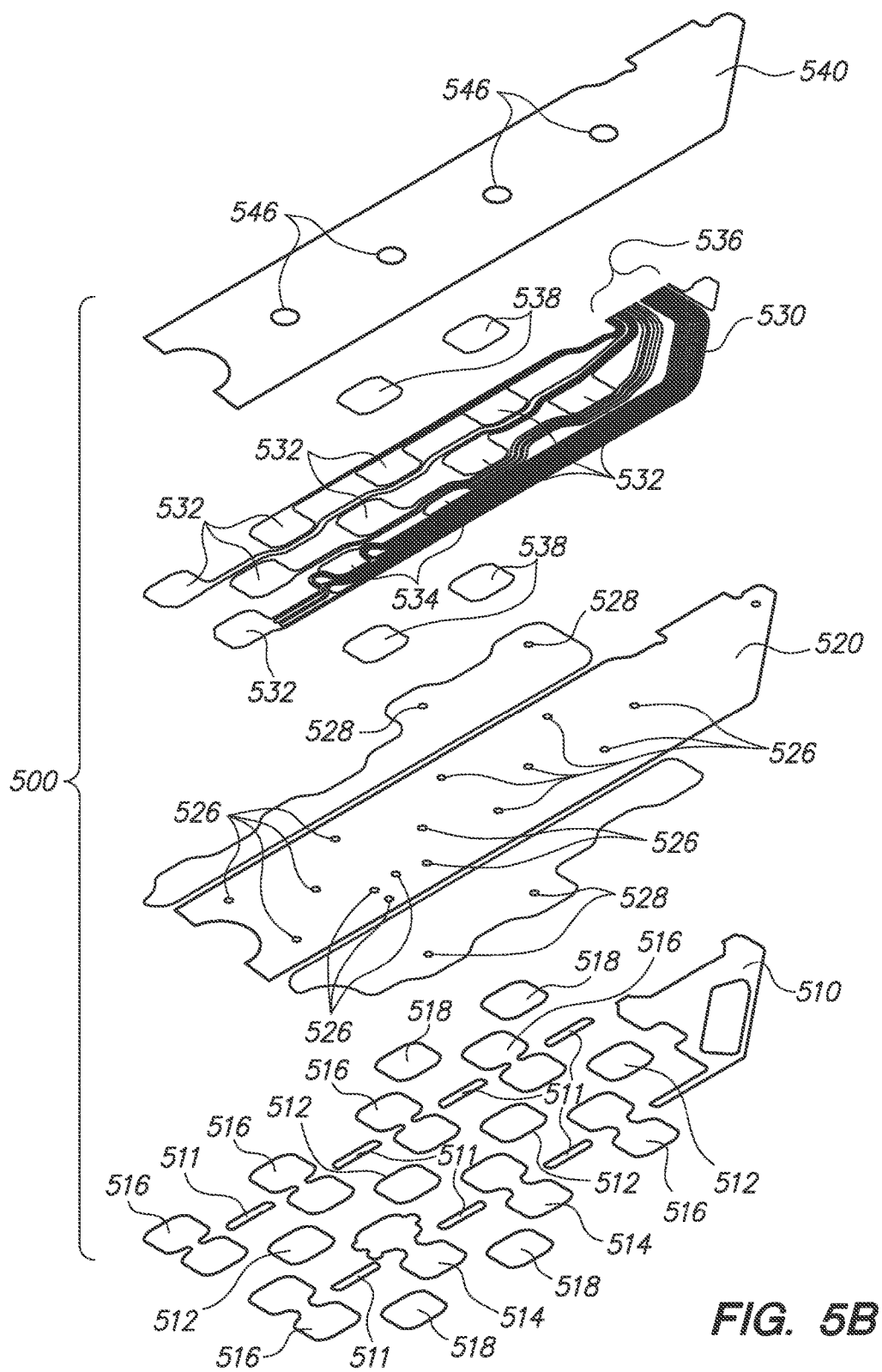
FIG. 5B is an exploded view of the flexure tail of FIG. 5A.
Figure 5C:
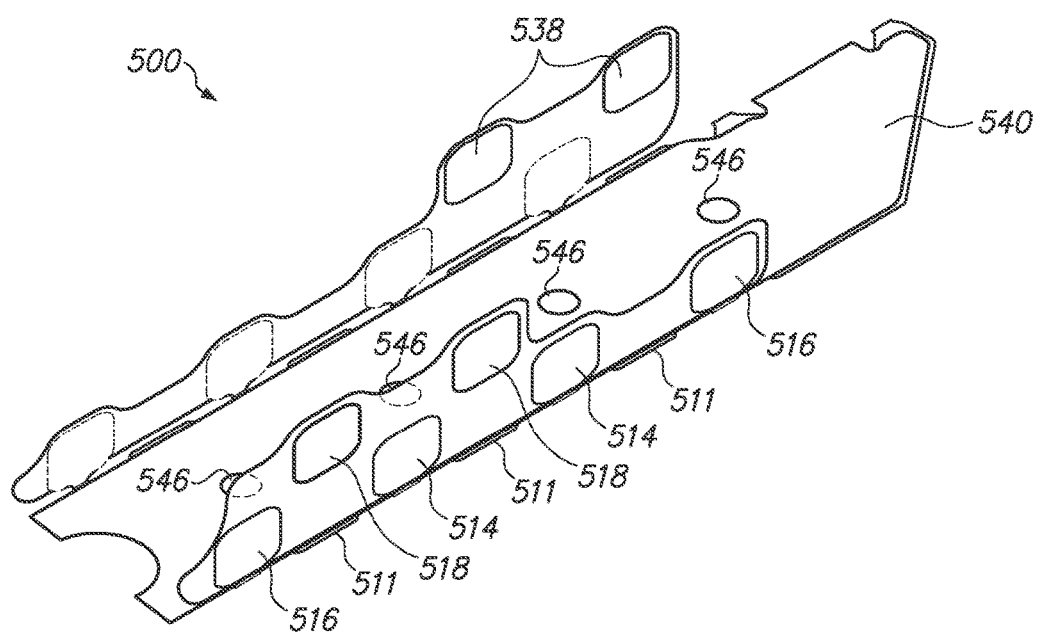
FIG. 5C depicts the flexure tail terminal region of FIG. 5A, partially folded.
Figure 5D:
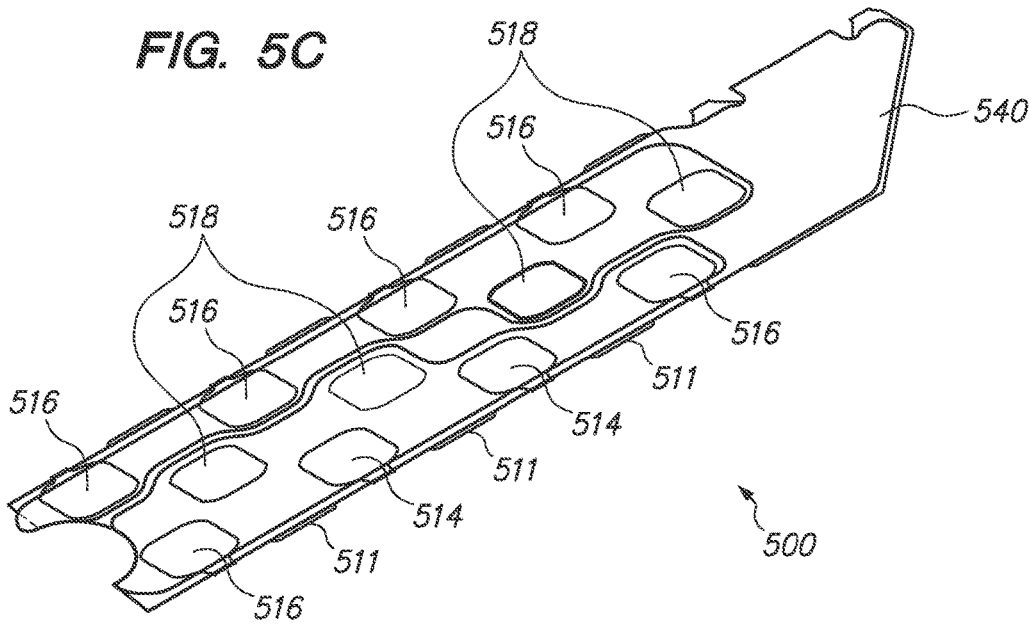
FIG. 5D depicts the flexure tail terminal region of FIG. 5A, after folding.

FIG. 5A depicts a terminal region of a flexure tail 500 before folding, according to another embodiment of the present invention. FIG. 5B is an exploded view of the flexure tail 500. FIG. 5C depicts the flexure tail terminal region 500, partially folded. This view is to clarify the direction of folding; the flexure tail 500 does not necessarily attain such exact configuration during the manufacturing process. FIG. 5D depicts the flexure tail 500 after folding.

Now referring to FIGS. 5A-5D, the laminated flexure 500 includes a metallic conductive layer 530 (e.g. copper) that includes a plurality of electrically conductive traces 536 that are elongated and narrow and electrically connected to the read head (e.g. read head 280 of FIG. 2). The laminated flexure 500 also includes a metallic structural layer 510 (e.g. stainless steel) that is stiffer than the conductive layer 530. A first dielectric layer 520 (e.g. polyimide) is disposed between the structural layer 510 and the conductive layer 530. A second dielectric layer 540 (e.g. polyimide) substantially covers the conductive layer 530 in a flexure tail bonding region 560 (the region that overlaps the FPC). Note that the second dielectric layer 540 is shown partially cut away in the view of FIG. 5A, so that underlying features can be visible.

In the embodiment of FIGS. 5A-5D, the structural layer 510 includes a plurality of flexure bond pads 512, 514, 516, 518 in the flexure tail bonding region 560. Each of the plurality of flexure bond pads 514, 516, 518 in the structural layer 510 are configured to be aligned with, face, and be bonded to a corresponding one of a plurality of FPC bond pads (e.g. like FPC bond pads 380 of FIG. 3). Note that in the embodiment of FIGS. 5A-5D, the flexure tail should be routed conventionally so that the structural layer 510 (before folding) would face away from the FPC, except that after folding some or all of bond pads 514, 516, 518 in the structural layer are facing and being bonded to the FPC bond pads (in contravention of the conventional practice of bonding to exposed bond pads of the flexure's conductive layer not structural layer).

In the embodiment of FIGS. 5A-5D, each of the plurality of flexure bond pads 512, 514, 516 in the structural layer 510 is electrically connected to a corresponding one of the plurality of electrically conductive traces 536 in the conductive layer 530 by one of a first plurality of vias 526 through the first dielectric layer 520. Each of the first plurality of vias 526 through the first conductive layer 530 may optionally comprise a hole through the first conductive layer 530 that is filled with an electrically conductive material contacting a widened via connection land 532 or 534 in the conductive layer 530. Note that the vias 526 are too small to be practically depicted with dashed lines in FIG. 5A, though they are underlying features obscured by the conductive layer in FIG. 5A.

Advantageously, in the embodiment of FIGS. 5A-5D the via connection lands 532, 534 need not be as large as the bond pads 512, 514, 516 in the structural layer 510, because the via connection lands 532, 534 need not match the footprint of the FPC bond pads or be large enough to accommodate the solder or adhesive for bonding thereto.

Therefore, more space can be made available for the traces 536 in the conductive layer 530 than in conventional flexure tail designs. For example, the smaller size of the via connection lands 534 (relative to the corresponding bond pads 514) allows more space for the traces 536 in the conductive layer 530.

In the embodiment of FIGS. 5A-5D, the flexure tail 500 is folded upon itself in the flexure tail bonding region 560, so that the conductive layer 530 becomes an inner layer (i.e. disposed between flexure bond pads 512, 514 of the structural layer 510, and the flexure bond pads 514, 516, 518 of the structural layer 510). In the embodiment of FIGS. 5A-5D, the structural layer 510 may optionally include a plurality of edge stiffening islands 511 that may reinforce the edges of the flexure tail 500 in the bonding region 560, after folding. After folding in the embodiment of FIGS. 5A-5D, the structural layer 510 is disposed externally on both sides of the conductive layer 530 in the flexure tail bonding region 560, with the flexure bond pads 512, 514, 516, 518 of the structural layer 510 being outward facing.

In the embodiment of FIGS. 5A-5D, the second dielectric layer 540 includes a second plurality of vias 546, each comprising a hole through the second dielectric layer 540 that is filled with electrically conductive solder. The embodiment of FIGS. 5A-5D also includes a third plurality of vias 528 through the first dielectric layer 520, which underlie the bond pads 518 in the structural layer 510. The second plurality of vias 546, in conjunction with the third plurality of vias 528, allow the bond pads 518 to be electrically connected (through both the first and second dielectric layers 520, 540) to the middle row of the connection lands 532 in the conductive layer 530, after folding. Optional conductive backing regions 538 may help make such electrical connections by effectively filling the third plurality of vias 528 with conductive metal (e.g. copper).

Now referring to the embodiment of FIG. 5D after folding, ACF bonding to the FPC may be accomplished by bringing a thermode tool into contact with the structural layer 510 on the second outward face of the flexure tail 500, to press the plurality of flexure bond pads 514, 516, 518 of the structural layer 510 on the first outward face against the plurality of FPC bond pads (e.g. FPC bond pads 380 of FIG. 3) for a period. The flexure bond pads 514, 516, 518 in the structural layer 510 may optionally include a gold coating, for example to help facilitate or increase the electrical conductivity of such bonding to FPC bond pads.

In the foregoing specification, the invention is described with reference to specific exemplary embodiments, but those skilled in the art will recognize that the invention is not limited to those. It is contemplated that various features and aspects of the invention may be used individually or jointly and possibly in a different environment or application. The specification and drawings are, accordingly, to be regarded as illustrative and exemplary rather than restrictive. For example, the word "preferably," and the phrase "preferably but not necessarily," are used synonymously herein to consistently include the meaning of "not necessarily" or optionally. "Comprising," "including," and "having," are intended to be open-ended terms.

The invention claimed is:

1. A disk drive comprising:
a disk drive base;
a disk rotably mounted to the disk drive base;
an actuator pivotably mounted to the disk drive base, the actuator including a flexible printed circuit (FPC) that includes a plurality of electrically conductive FPC bond pads; and
at least one head gimbal assembly attached to the actuator, the at least one head gimbal assembly comprising a read head; and
a suspension assembly that comprises
a load beam, and
a laminate flexure that includes a tongue portion that connects to the read head and a flexure tail that extends to a flexure tail bonding region that overlaps the FPC, the laminate flexure comprising a conductive layer that is metallic and that includes a plurality of electrically conductive traces that are elongated and narrow and electrically connected to the read head, a structural layer that is metallic and stiffer than the conductive layer, a first dielectric layer between the structural layer and the conductive layer, and a second dielectric layer that substantially covers the conductive layer in the flexure tail bonding region;
wherein the structural layer includes a plurality of flexure bond pads in the flexure tail bonding region, each of the plurality of flexure bond pads in the structural layer being aligned with, facing, and being bonded to a corresponding one of the plurality of FPC bond pads; and
wherein each of the plurality of flexure bond pads is electrically connected to a corresponding one of the plurality of electrically conductive traces by one of a first plurality of vias through the first dielectric layer.

2. The disk drive of claim 1 wherein the structural layer comprises stainless steel, the first dielectric layer comprises polyimide, and the conductive layer comprises copper.

3. The disk drive of claim 2 wherein at least one of the plurality of flexure bond pads of the structural layer includes a gold coating.

4. The disk drive of claim 1 wherein each of the flexure bond pads of the structural layer is bonded to the corresponding one of the plurality of FPC bond pads by an anisotropic conductive film that includes a plurality of electrically conductive beads.

5. The disk drive of claim 1 wherein each of the first plurality of vias through the first conductive layer comprises a hole through the first conductive layer that is filled with an electrically conductive material.

6. The disk drive of claim 1 wherein the flexure tail is folded upon itself in the flexure tail bonding region, so that the conductive layer is an inner layer disposed between flexure bond pads of the structural layer in the flexure tail bonding region, the structural layer being disposed externally on both sides of the conductive layer in the flexure tail bonding region, with the flexure bond pads of the structural layer being outward facing.

7. The disk drive of claim 6 wherein the second dielectric layer includes a second plurality of vias, each comprising a hole through the second conductive layer that is filled with electrically conductive solder.

* * * * *